United States Patent
Peng et al.

(10) Patent No.: US 11,308,197 B2
(45) Date of Patent: Apr. 19, 2022

(54) INTELLIGENT DEVICE RECOGNITION USING PROMPT FREQUENCY INFORMATION

(71) Applicant: BEIJING XIAOMI MOBILE SOFTWARE CO., LTD., Beijing (CN)

(72) Inventors: Wenjia Peng, Beijing (CN); Xinglong Zhang, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 99 days.

(21) Appl. No.: 17/037,092

(22) Filed: Sep. 29, 2020

(65) Prior Publication Data
US 2021/0365543 A1 Nov. 25, 2021

(30) Foreign Application Priority Data
May 22, 2020 (CN) .......................... 202010443069.7

(51) Int. Cl.
*G06F 21/44* (2013.01)
*G16Y 40/10* (2020.01)
*G16Y 30/10* (2020.01)
*H04L 9/32* (2006.01)

(52) U.S. Cl.
CPC ............ *G06F 21/445* (2013.01); *G16Y 30/10* (2020.01); *G16Y 40/10* (2020.01); *H04L 9/3234* (2013.01)

(58) Field of Classification Search
CPC ....... G06F 21/445; G06F 21/44; G16Y 30/10; G16Y 40/10; H04L 9/3234
See application file for complete search history.

(56) References Cited

U.S. PATENT DOCUMENTS
2018/0167981 A1 6/2018 Jonna et al.

FOREIGN PATENT DOCUMENTS
WO 02075952 A1 9/2002

OTHER PUBLICATIONS

Extended European Search Report issued in EP Application No. 20216981.9 dated Jun. 14, 2021, (8p).

*Primary Examiner* — Quazi Farooqui
(74) *Attorney, Agent, or Firm* — Arch & Lake LLP

(57) ABSTRACT

Methods, apparatuses, and non-transitory computer-readable storage mediums are provided for intelligent device recognition. The method may be applied to a terminal device. The terminal device may recognize prompt frequency information of a prompt circuit of an intelligent device. The terminal device may also determine a unique identification code of the intelligent device based on the prompt frequency information. The terminal device may further determine relevant information of the intelligent device based on the unique identification code.

14 Claims, 4 Drawing Sheets

Querying a mapping table between the prompt frequency information and the unique identification code of the intelligent device based on the prompt frequency information, and determining the unique identification code of the intelligent device — S123

FIG. 4

Recognizing a shape of the intelligent device — S14

Determining the relevant information of the intelligent device based on the shape and the unique identification code of the intelligent device — S15

FIG. 5

Obtaining prompt frequency information of a prompt component of an intelligent device, the prompt frequency information representing a unique identification code of the intelligent device — S21

Controlling the prompt component of the intelligent device to provide prompt information based on the prompt frequency information — S22

FIG. 6

Obtaining visual prompt frequency information of a visual prompt component of the intelligent device, the visual prompt frequency information representing the unique identification code of the intelligent device — S211

Controlling the visual prompt component of the intelligent device to provide a visual prompt based on the visual prompt frequency information — S221

FIG. 7

INTELLIGENT DEVICE RECOGNITION USING PROMPT FREQUENCY INFORMATION

CROSS-REFERENCE TO RELATED APPLICATION

This application claims the priority to Chinese Patent Application Serial No. 202010443069.7, filed on May 22, 2020, the entire contents of which are incorporated herein by reference in its entirety for all purposes.

TECHNICAL FIELD

The present disclosure relates to a field of an intelligent device, and more particularly to an intelligent device recognition method and an apparatus, an intelligent device processing method and an apparatus, and a storage medium.

BACKGROUND

In the related art, with the development of science and technology, there are more and more categories of intelligent devices. How to recognize the intelligent device becomes a concerned problem. In the related art, relevant information of the intelligent device may be determined by a camera device of the terminal device obtaining a shape or appearance of the intelligent device, or the terminal device may obtain the relevant information of the intelligent device by communicating with the intelligent device.

SUMMARY

In view of this, the present disclosure provides an intelligent device recognition method and an apparatus, an intelligent device processing method and an apparatus, and a storage medium.

According to a first aspect of the present disclosure, an intelligent device recognition method applied to a terminal device is provided. The terminal device may recognize prompt frequency information of a prompt circuit of an intelligent device. The terminal device may also determine a unique identification code of the intelligent device based on the prompt frequency information. The terminal device may further determine relevant information of the intelligent device based on the unique identification code.

According to a second aspect of the present disclosure, an intelligent device processing method is provided. The method may include obtaining prompt frequency information of a prompt circuit of an intelligent device. The prompt frequency information may represent a unique identification code of the intelligent device. The method may further include controlling the prompt circuit to provide prompt information based on the prompt frequency information.

According to a third aspect of the present disclosure, an intelligent device recognition apparatus is provided. The apparatus may include one or more processors, a non-transitory computer-readable memory storing instructions executable by the one or more processors. The one or more processors may be configured to recognize prompt frequency information of a prompt circuit of an intelligent device. The one or more processors may also be configured to determine a unique identification code of the intelligent device based on the prompt frequency information. The one or more processors may further be configured to determine relevant information of the intelligent device based on the unique identification code.

According to a fourth aspect of the present disclosure, an intelligent device processing apparatus is provided. The apparatus may include one or more processors, a non-transitory computer-readable memory storing instructions executable by the one or more processors. The one or more processors may be configured to obtain prompt frequency information of a prompt circuit of an intelligent device. The prompt frequency information may represent a unique identification code of the intelligent device. The one or more processors may further be configured to control the prompt circuit to provide prompt information based on the prompt frequency information.

According to a fifth aspect of the present disclosure, a non-transitory computer-readable storage medium having stored therein instructions is provided. When the instructions are executed by one or more processors in a mobile terminal, the instructions may cause the mobile terminal to implement an intelligent device recognition method. The method may include recognizing prompt frequency information of a prompt circuit of an intelligent device. The method may also include determining a unique identification code of the intelligent device based on the prompt frequency information. The method may further include determining relevant information of the intelligent device based on the unique identification code.

According to a sixth aspect of the present disclosure, a non-transitory computer-readable storage medium having stored therein instructions is provided. When the instructions are executed by one or more processors in a mobile terminal, the instructions may cause the mobile terminal to implement an intelligent device processing method. The method may include obtaining prompt frequency information of a prompt circuit of an intelligent device. The prompt frequency information may represent a unique identification code of the intelligent device. The method may further include controlling the prompt circuit to provide prompt information based on the prompt frequency information.

It is to be understood that both the foregoing general description and the following detailed description are examples and explanatory only and are not restrictive of the present disclosure, as claimed.

BRIEF DESCRIPTION OF THE DRAWINGS

The accompanying drawings, which are incorporated in and constitute a part of this specification, illustrate embodiments consistent with the present disclosure, and serve to explain the principle of the present disclosure together with the description.

FIG. 4 is a flow chart illustrating a method for determining a unique identification code of the intelligent device based on the prompt frequency information at block S12 in FIG. 1, according to an example of the present disclosure.

FIG. 5 is a flow chart illustrating an intelligent device recognition method, according to an example of the present disclosure.

FIG. 6 is a flow chart illustrating an intelligent device processing method, according to an example of the present disclosure.

FIG. 7 is a flow chart illustrating a method for obtaining prompt frequency information of a prompt component of an intelligent device at block S21 in FIG. 6, according to an example of the present disclosure.

DETAILED DESCRIPTION

Figure 1:
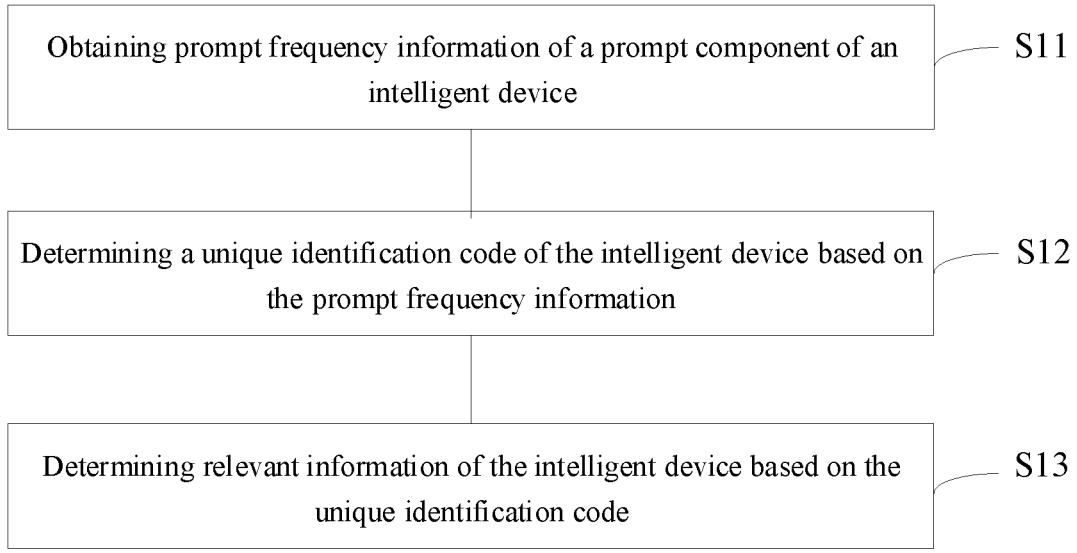
FIG. 1 is a flow chart illustrating an intelligent device recognition method, according to an example of the present disclosure.

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of one or more embodiments do not represent all implementations consistent with the present disclosure. Instead, they are merely examples of apparatuses and methods consistent with aspects related to the present disclosure as recited in the appended claims.

The terminology used in the present disclosure is for the purpose of describing particular embodiments only and is not intended to limit the present disclosure. As used in the present disclosure and the appended claims, the singular forms "a," "an," and "the" are intended to include the plural forms as well, unless the context clearly indicates otherwise. It shall also be understood that the term "and/or" used herein is intended to signify and include any or all possible combinations of one or more of the associated listed items.

It shall be understood that, although the terms "first," "second," "third," etc. may be used herein to describe various information, the information should not be limited by these terms. These terms are only used to distinguish one category of information from another. For example, without departing from the scope of the present disclosure, first information may be termed as second information; and similarly, second information may also be termed as first information. As used herein, the term "if" may be understood to mean "when" or "upon" or "in response to a judgment," depending on the context.

In the related art, relevant information of the intelligent device may be determined by a camera device of the terminal device obtaining a shape or appearance of the intelligent device, or the terminal device may obtain the relevant information of the intelligent device by communicating with the intelligent device. In the way of obtaining the shape or appearance of the intelligent device by the camera device of the terminal device to determine the relevant information of the intelligent device, it is necessary for different types or models of intelligent devices to have different shapes for recognition. However, with the development of the intelligent device, in order to meet different requirements, a plurality of different types of intelligent devices have similar shapes and structures, such as a cylindrical lamp and a cylindrical air purifier, whose shapes and structures are similar. It is difficult for the camera device of the terminal device to determine whether it is the cylindrical lamp or the cylindrical air purifier through recognizing the shape. Obtaining the relevant information of the intelligent device by a communication between the terminal device and the intelligent device requires to add corresponding hardware or other software function when the intelligent device is designed to realize network connection, such as Bluetooth or Wi-Fi connection, which virtually increases a cost of the intelligent device. In the related art, the recognition and management of the intelligent device have poor compatibility and popularity, so providing a simple and convenient intelligent device recognition method and managing method is a technical solution to be solved.

Embodiments of the present disclosure provide an intelligent device recognition method. FIG. 1 is a flow chart illustrating an intelligent device recognition method according to an example of the present disclosure. The intelligent device recognition method is applied to a terminal device, and includes the following.

At block S11, prompt frequency information of a prompt component of an intelligent device is obtained. The obtained prompt frequency information may be recognized. The prompt component, for example, may be a prompt circuit such as a light outputting circuit or sound outputting circuit. The prompt circuit is able to output information that includes prompt frequency information. The prompt circuit, for example, may be on the intelligent device, and the prompt frequency information may be used to identify the intelligent device based on a unique identification code.

At block S12, a unique identification code of the intelligent device is determined based on the prompt frequency information.

At block S13, relevant information of the intelligent device is determined based on the unique identification code.

With the intelligent device recognition method provided by the present disclosure, the prompt frequency information of the prompt component of the intelligent device is obtained and/or recognized, the unique identification code of the intelligent device is determined based on the recognized prompt frequency information, and the relevant information of the intelligent device is determined based on the unique identification code of the intelligent device.

In the intelligent device recognition method provided by the present disclosure, a mapping relationship between the unique identification code of the intelligent device and the prompt frequency information of the prompt component of the intelligent device is established. For example, when the unique identification code of the intelligent device is a 16-bit number, the 16-bit number may be converted into prompt information that is capable to be used for the prompt component of the intelligent device to perform a prompt based on the prompt frequency information, such that the terminal device may determine the unique identification code by obtaining the prompt frequency information in the prompt information of the prompt component of the intelligent device, and then determine the relevant information of the intelligent device.

The relevant information of the intelligent device may be any information representing the intelligent device, such as a manufacturer, a type or a model of the intelligent device.

The terminal device may be a mobile terminal device or other terminal devices, such as a mobile phone, a PAD or a notebook computer.

The present disclosure discloses a simple and convenient intelligent device recognition method. The mapping relationship between the unique identification code of the intelligent device and the prompt frequency information of the prompt component of the intelligent device is established, and an abstract unique identification code of the intelligent device is converted into recognizable prompt information, such as sound or visual prompt, to facilitate the terminal device to recognize and manage the intelligent device. By recognizing the prompt frequency information in the prompt information given by the prompt component of the intelligent device, the unique identification code of the intelligent device is determined, and then the relevant information of the intelligent device is determined. With the intelligent device recognition method provided by the present disclosure, it does not require the intelligent device to add a hardware component in order to be able to communicate with the terminal device, and it avoids a recognition error generated due to recognizing the shape.

Figure 2:
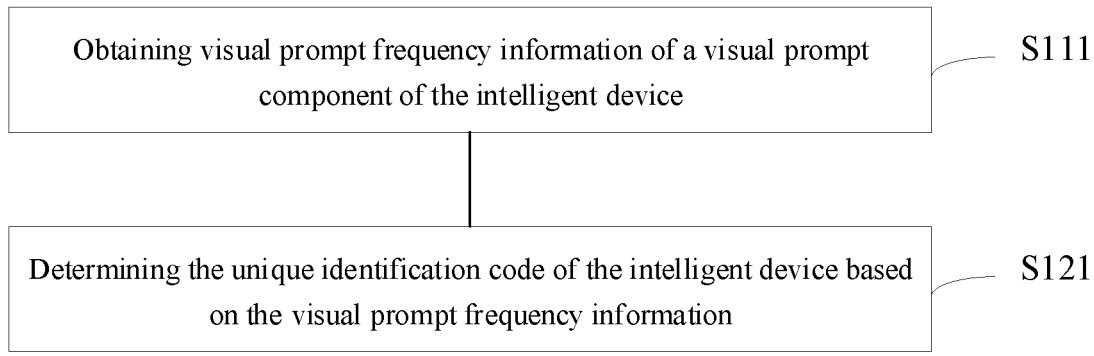
FIG. 2 is a flow chart illustrating a method for recognizing prompt frequency information of a prompt component of an intelligent device at block S11 in FIG. 1, according to an example of the present disclosure.

The present disclosure provides an intelligent device recognition method. As illustrated in FIG. 2, FIG. 2 is a flow chart illustrating a method for recognizing the prompt frequency information of the prompt component of the intelligent device at block S11 in FIG. 1.

At block S111, visual prompt frequency information of a visual prompt component of the intelligent device is obtained. The visual prompt frequency information may be recognized.

Determining the unique identification code of the intelligent device based on the prompt frequency information at block S12 in FIG. 1 includes the following.

At block S121, the unique identification code of the intelligent device is determined based on the visual prompt frequency information.

In the related art, the intelligent device may be disposed with the visual prompt component, such as a light prompt component. The light prompt component may be a prompt light, a display light, etc. For example, an air purifier may have a prompt light disposed thereon to indicate that the air purifier is in an operating state, and a washing machine may have a switch display light disposed thereon to indicate that the washing machine is in an operating state.

A mapping relationship between the unique identification code of intelligent device and the visual prompt frequency information of the visual prompt component of the intelligent device may be established, such that the terminal device may obtain the unique identification code of the intelligent device according to a visual prompt made by the visual prompt component of the intelligent device based on the visual prompt frequency information. For example, the unique identification code of the intelligent device is a 16-bit number, and the 16-bit number may be converted into a binary number, which is represented by 1 and 0. A first preset frequency and a second preset frequency of the visual prompt component of intelligent device are respectively represented by 1 and 0. In this way, the visual prompt component of the intelligent device may flash based on the first preset frequency and the second preset frequency indicated by the binary number converted from the 16-bit number within a unit period to perform the visual prompt. The unique identification code of the intelligent device is provided to the terminal device based on the visual prompt frequency information of the visual prompt component of the intelligent device, such as the light prompt component. Turning on and off state of the light prompt component of the intelligent device may be respectively represented by 1 and 0. In this way, the light prompt component of the intelligent device may flash between on and off for the visual prompt based on the binary number converted from the 16-bit number within the unit period.

The terminal device obtains the visual prompt frequency information of the visual prompt component of the intelligent device by a camera component or other component, and then determines the unique identification code of the intelligent device.

With the intelligent device recognition method provided by present disclosure, by recognizing the visual prompt frequency information given by the visual prompt component of the intelligent device, the unique identification code of the intelligent device is determined, and then the relevant information of the intelligent device is determined. Without changing a hardware condition of the intelligent device, the intelligent device may be recognized and managed simply and conveniently.

Figure 3:
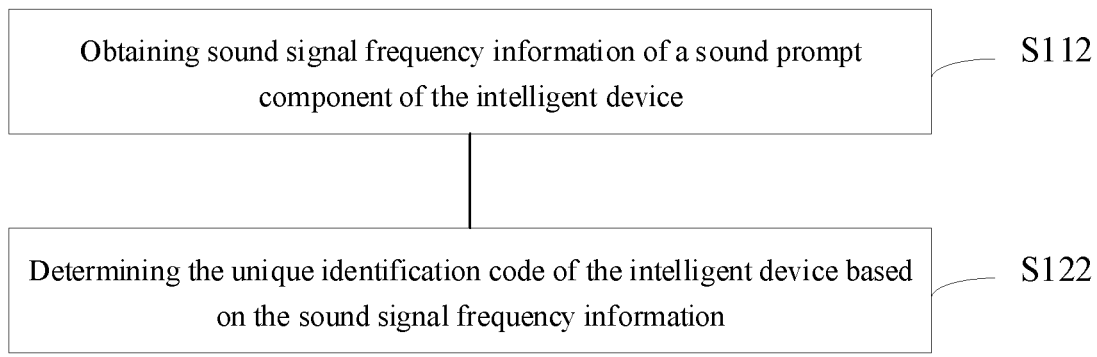
FIG. 3 is a flow chart illustrating a method for recognizing prompt frequency information of a prompt component of an intelligent device at block S11 in FIG. 1, according to an example of the present disclosure.

The present disclosure provides an intelligent device recognition method. As illustrated in FIG. 3, FIG. 3 is a flow chart illustrating a method for recognizing the prompt frequency information of the prompt component of the intelligent device at block S11 in FIG. 1.

At block S112, sound signal frequency information of a sound prompt component of the intelligent device is obtained. The obtained sound signal frequency information may be recognized.

Determining the unique identification code of the intelligent device based on the prompt frequency information at block S12 in FIG. 1 includes following.

At block S122, the unique identification code of the intelligent device is determined based on the sound signal frequency information.

In the related art, the intelligent device may be disposed with the sound prompt component. For example, an air purifier may have a sound prompt component disposed thereon to prompt a start or an end of a timing of the air purifier. A washing machine may have a sound prompt component disposed thereon to prompt an end or a start of an operating program of the washing machine. A mapping relationship between the unique identification code of the intelligent device and the sound signal frequency information of the sound prompt component of the intelligent device may be established, such that the terminal device may obtain the unique identification code of the intelligent device based on a sound prompt made by the sound prompt component of the intelligent device according to the sound signal frequency information. For example, the unique identification code of the intelligent device is a 16-bit number. The 16-bit number may be converted into a binary number, represented by 1 and 0. A high level and a low level of a sound signal of the sound prompt component of the intelligent device are respectively represented by 1 and 0. In this way, the sound prompt component of the intelligent device may play a sound with the high level and the low level based on the binary number converted from the 16-bit number within a unit period, that is, the sound is played based on the sound signal frequency information, to provide the terminal device with the unique identification code of the intelligent device. The terminal device obtains the sound signal frequency information of the sound prompt component of the intelligent device through a sound obtaining component, and then determines the unique identification code of the intelligent device.

With the intelligent device recognition method provided by the present disclosure, by recognizing the prompt frequency information in the sound signal frequency information given by the sound prompt component of the intelligent device, the unique identification code of the intelligent device is determined and then the relevant information of the intelligent device is determined. Without changing a hardware condition of the intelligent device, the intelligent device may be recognized and managed simply and conveniently.

The present disclosure provides an intelligent device recognition method. As illustrated in FIG. 4, FIG. 4 is a flow chart illustrating a method for determining the unique identification code of the intelligent device based on the prompt frequency information at block S12 in FIG. 1. The method includes the following.

At block S123, a mapping table between the prompt frequency information and the unique identification code of the intelligent device is queried based on the prompt frequency information, and the unique identification code of the intelligent device is determined.

In the intelligent device recognition method provided by the present disclosure, the terminal device may determine the unique identification code of the intelligent device by querying the mapping table between the prompt frequency information and the unique identification code of the intelligent device. The mapping table between the prompt frequency information and the unique identification code of the intelligent device may be stored on the terminal device or a server. In order to facilitate to recognize the intelligent device, the mapping relationship between the unique identification code of the intelligent device and the prompt frequency information of the prompt component of the intelligent device may be established. As described above, the prompt component may be either a sound prompt component or a visual prompt component.

Taking the visual prompt component as an example, how to establish the mapping relationship between the unique identification code of the intelligent device and the prompt frequency information of the prompt component of the intelligent device may be described. When the unique identification code of the intelligent device is a 16-bit number and/or letter, the 16-bit number and/or letter may be converted into prompt information that is capable of being used for the visual prompt component of the intelligent device to perform a visual prompt based on the visual prompt frequency information. For example, the 16-bit number and/or letter may be converted into a binary number, which is represented by 1 and 0, and a first preset frequency and a second preset frequency of the visual prompt component of the intelligent device are respectively represented by 1 and 0. In this way, the 16-bit number and/or letter may be converted into the visual prompt information of the visual prompt component of the intelligent device based on the first preset frequency and the second preset frequency within a unit period, such that the visual frequency prompt information of the visual prompt component of the intelligent device within the unit period may corresponds to the unique identification code of the intelligent device.

The present disclosure merely takes the visual prompt component as an example to list a way of corresponding the unique identification code of the intelligent device to the visual prompt frequency information of the visual prompt component, and does not constitute a limitation of the present disclosure. Any way for forming the mapping relationship between the unique identification code of the intelligent device and the prompt frequency information of the prompt component of the intelligent device that may solve the technical problems to be solved by the present disclosure may be within the protection scope of the present disclosure.

The present disclosure provides an intelligent device recognition method. As illustrated in FIG. 5, FIG. 5 is a flow chart illustrating an intelligent device recognition method according to an example of the present disclosure. The method includes the following.

At block S14, a shape of the intelligent device is recognized.

At block S15, the relevant information of the intelligent device is determined based on the shape and the unique identification code of the intelligent device.

In the intelligent device recognition method, the shape of the intelligent device may also be recognized, and the relevant information of the intelligent device may be determined based on the shape and the unique identification code of the intelligent device. In this way, the intelligent device may be recognized more accurately. The terminal device may recognize the shape of the intelligent device by a camera or in other means. For example, the shape of the intelligent device may be obtained by the camera of the terminal device.

In the intelligent device recognition method provided by the present disclosure, the shape of the intelligent device may be recognized before determining the unique identification code of the intelligent device. First, the shape of the intelligent device is preliminarily determined, and then the unique identification code of the intelligent device is determined. Alternatively, the shape of the intelligent device may also be recognized after determining the unique identification code of the intelligent device. The unique identification code of the intelligent device may be determined first, and then the shape of the intelligent device is determined. In this way, the relevant information of the intelligent device may be determined in multiple dimensions, to accurately recognize the intelligent device.

Embodiments of the present disclosure provide an intelligent device processing method. FIG. 6 is a flow chart illustrating an intelligent device processing method according to an example of the present disclosure. The method includes the following.

At block S21, prompt frequency information of a prompt component of an intelligent device is obtained. The prompt frequency information represents a unique identification code of the intelligent device.

At block S22, the prompt component of the intelligent device is controlled to provide prompt information based on the prompt frequency information.

In the intelligent device processing method provided by the present disclosure, a mapping relationship between the unique identification code of the intelligent device and the prompt frequency information of the component of the intelligent device is established. For example, when the unique identification code of the intelligent device is a 16-bit number, the 16-bit number may be converted into prompt information that can be used for the prompt component of the intelligent device to provide a prompt based on the prompt frequency information.

The prompt frequency information representing the unique identification code of the intelligent device may be stored in the intelligent device or in a server.

The present disclosure discloses a simple and convenient intelligent device processing method. By establishing the mapping relationship between the unique identification code of the intelligent device and the prompt frequency information of the prompt component of the intelligent device, the unique identification code of the intelligent device is converted into the recognizable prompt information such as sound prompt information and visual prompt information, to facilitate a management device such as the terminal device to recognize and manage the intelligent device.

The present disclosure provides an intelligent device processing method. As illustrated in FIG. 7, FIG. 7 is a flow chart illustrating a method for obtaining the prompt frequency information of the prompt component of the intelligent device at block S21 in FIG. 6, and includes the following.

At block S211, visual prompt frequency information of a visual prompt component of the intelligent device is obtained. The visual prompt frequency information represents the unique identification code of the intelligent device.

Controlling the prompt component of the intelligent device to provide the prompt information based on the prompt frequency information at block S22 in FIG. 6 includes following.

At block S221, the visual prompt component is controlled to provide a visual prompt based on the visual prompt frequency information.

In the intelligent device processing method provided by the present disclosure, the mapping relationship between the unique identification code of the intelligent device and the visual prompt frequency information of the visual prompt component of the intelligent device is established by utilizing the visual prompt component which is always disposed in the intelligent device, such that the unique identification code of the intelligent device may be represented by the visual prompt frequency information of the visual prompt component of the intelligent device. In this way, the unique identification code of the intelligent device may be provided to a management device, such as the terminal device, through the visual prompt component of the intelligent device by providing a visual prompt provided based on the visual prompt frequency information. For example, the unique identification code of the intelligent device is a 16-bit number. The 16-bit number may be converted into a binary number, which is represented by 1 and 0. A first preset frequency and a second preset frequency of the visual prompt component of the intelligent device respectively are respectively represented by 1 and 0. In this way, the visual prompt component of the intelligent device may perform the visual prompt at the first preset frequency and the second preset frequency based on the binary number converted from the 16-bit number within a unit period, to provide the terminal device with the unique identification code of the intelligent device.

With the intelligent device processing method provided by the present disclosure, the unique identification code of the intelligent device is represented by the prompt frequency information in the visual prompt frequency information given by the visual prompt component (e.g., a light prompt component) of the intelligent device, which is convenient for the terminal device to recognize and manage the intelligent device.

Figure 8:
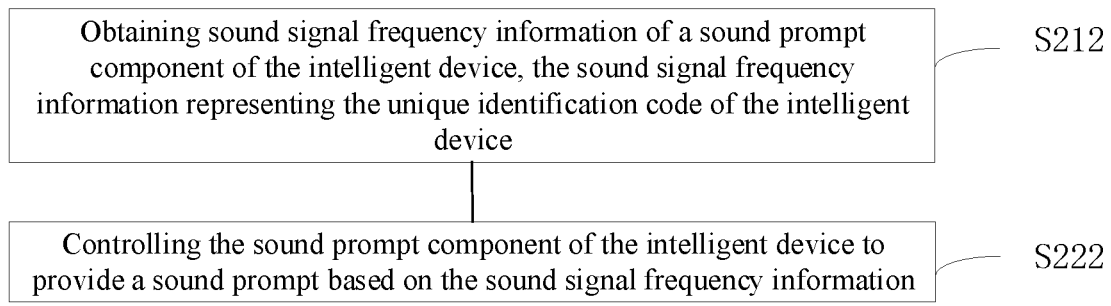
FIG. 8 is a flow chart illustrating a method for obtaining prompt frequency information of a prompt component of an intelligent device at block S21 in FIG. 6, according to an example of the present disclosure.

The present disclosure provides an intelligent device processing method. As illustrated in FIG. 8, FIG. 8 is a flow chart illustrating a method for obtaining the prompt frequency information of the prompt component of the intelligent device at block S21 in FIG. 6. The method includes the following.

At block S212, sound signal frequency information of a sound prompt component of the intelligent device is obtained. The sound signal frequency information represents the unique identification code of the intelligent device.

Controlling the prompt component of the intelligent device to provide the prompt information based on the prompt frequency information at block S22 in FIG. 6 includes following.

At block S222, the sound prompt component is controlled to provide a sound prompt based on the sound signal frequency information.

In the intelligent device processing method provided by the present disclosure, the mapping relationship between the unique identification code of the intelligent device and the sound signal frequency information of the sound prompt component of the intelligent device is established by utilizing the sound prompt component which is always disposed in the intelligent device, such that the unique identification code of the intelligent device may be represented by the sound signal frequency information of the sound prompt component of the intelligent device. In this way, the unique identification code of the intelligent device may be provided to a management device such as the terminal device through the sound prompt component of the intelligent device by providing a sound according to the sound signal frequency information. For example, the unique identification code of the intelligent device is a 16-bit number. The 16-bit number may be converted into a binary number, which is represented by 1 and 0, and a high level and a low level of a sound signal of the sound prompt component of the intelligent device are respectively represented by 1 and 0. In this way, the sound prompt component of the intelligent device may play a sound with the high level and low level based on the binary number converted from the 16-bit number within a unit period, that is, the sound is played based on the sound signal frequency information of the sound signal, to provide the terminal device with the unique identification code of the intelligent device.

With the intelligent device processing method provided by the present disclosure, the unique identification code of the intelligent device is represented by the prompt frequency information in the sound signal frequency information given by the sound prompt component of the intelligent device, which is convenient for the terminal device to recognize and manage the intelligent device.

Figure 9:
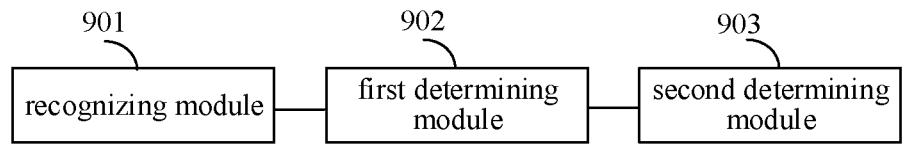
FIG. 9 is a block diagram illustrating an intelligent device recognition apparatus, according to an example of the present disclosure.

In one or more embodiments of the present disclosure, an intelligent device recognition apparatus is provided. As illustrated in FIG. 9, FIG. 9 is a block diagram illustrating an intelligent device recognition apparatus according to an example of the present disclosure. Referring to FIG. 9, the apparatus includes a recognizing module 901, a first determining module 902, and a second determining module 903.

The recognizing module 901 is configured to recognize prompt frequency information of a prompt component of an intelligent device.

The first determining module 902 is configured to determine a unique identification code of the intelligent device based on the prompt frequency information.

The second determining module 903 is configured to determine relevant information of the intelligent device based on the unique identification code.

In an embodiment of the present disclosure, the recognizing module 901 is configured to recognize visual prompt frequency information of a visual prompt component of the intelligent device. The first determining module 902 is configured to determine the unique identification code of the intelligent device based on the visual prompt frequency information.

In an embodiment of the present disclosure, the recognizing module 901 is configured to recognize sound signal frequency information of a sound prompt component of the intelligent device. The first determining module 902 is configured to determine the unique identification code of the intelligent device based on the sound signal frequency information.

In an embodiment of the present disclosure, the first determining module 902 is configured to query a mapping table between the prompt frequency information and the unique identification code of the intelligent device based on the prompt frequency information, and to determine the unique identification code of the intelligent device.

In an embodiment of the present disclosure, the recognizing module 901 is configured to recognize a shape of the intelligent device. The first determining module 902 is configured to determine the relevant information of the intelligent device based on the shape and the unique identification code of the intelligent device.

Figure 10:
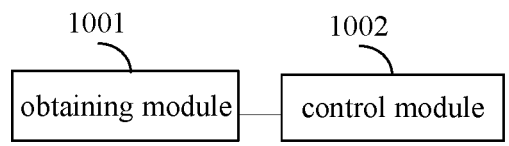
FIG. 10 is a block diagram illustrating an intelligent device processing apparatus, according to an example of the present disclosure.

In one or more embodiments of the present disclosure, an intelligent device processing apparatus is provided. As illustrated in FIG. 10, FIG. 10 is a block diagram illustrating an intelligent device processing apparatus according to an example of the present disclosure. Referring to FIG. 10, the apparatus includes an obtaining module 1001 and a control module 1002.

The obtaining module 1001 is configured to obtain prompt frequency information of a prompt component of an intelligent device. The prompt frequency information represents a unique identification code of the intelligent device.

The control module 1002 is configured to control the prompt component to provide prompt information based on the prompt frequency information.

In an embodiment of the present disclosure, the obtaining module 1001 is configured to obtain visual prompt frequency information of a visual prompt component of the intelligent device. The visual prompt frequency information represents the unique identification code of the intelligent device. The control module 1002 is configured to control the visual prompt component of the intelligent device to provide a visual prompt based on the visual prompt frequency information.

In an embodiment of the present disclosure, the obtaining module 1001 is configured to obtain sound signal frequency information of a sound prompt component of the intelligent device. The sound signal frequency information represents the unique identification code of the intelligent device. The control module 1002 is configured to control the sound prompt component of the intelligent device to provide a sound prompt based on the sound signal frequency information.

With regard to the apparatus in the above embodiments, a detailed implementation of each module performing operations has been described in detail in the embodiments related to the method, which may not be described in detail here.

Figure 11:
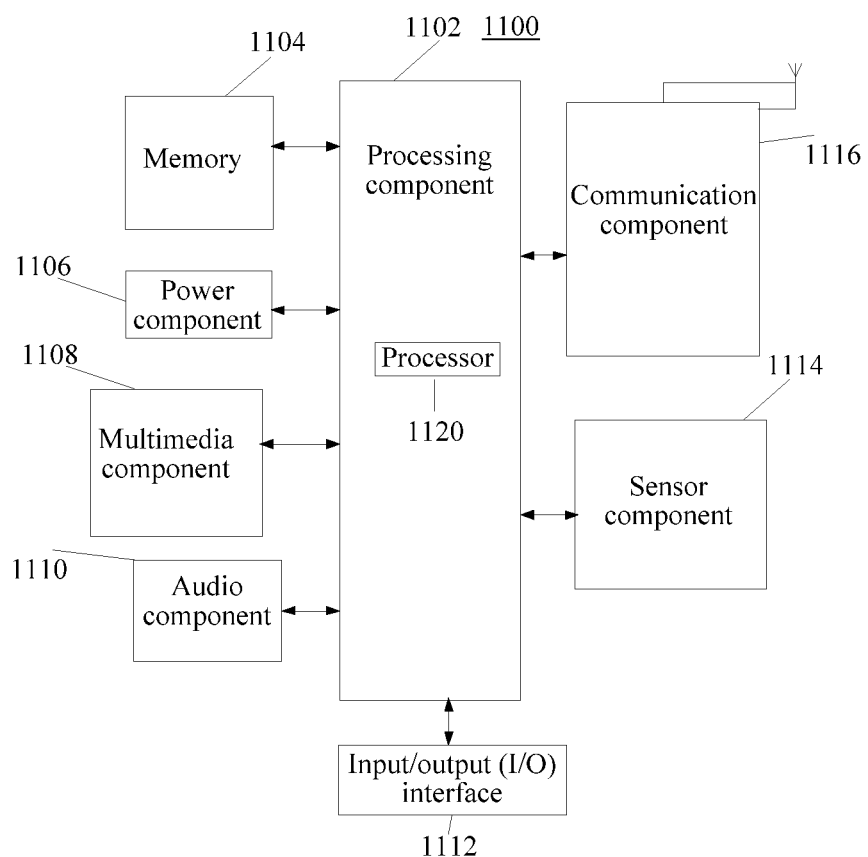
FIG. 11 is a block diagram (a general structure of a mobile terminal) illustrating an electronic device, according to an example of the present disclosure.

FIG. 11 is a block diagram illustrating an electronic device 1100 according to an example of the present disclosure. For example, the device 1100 may be a mobile phone, a computer, a digital broadcasting terminal, a message sending and receiving equipment, a game controller, a tablet device, a medical device, a fitness equipment, a personal digital assistant or the like.

As illustrated in FIG. 11, the device 1100 may include one or more of the following components: a processing component 1102, a memory 1104, a power component 1106, a multimedia component 1108, an audio component 1110, an input/output (I/O) interface 1112, a sensor component 1114, and a communication component 1116.

The processing component 1102 typically controls overall operations of the device 1100, such as the operations associated with display, telephone calls, data communications, camera operations, and recording operations. The processing component 1102 may include one or more processors 1120 to execute instructions to perform all or part of the steps in the above described methods. Moreover, the processing component 1102 may include one or more modules which facilitate the interaction between the processing component 1102 and other components. For example, the processing component 1102 may include a multimedia module to facilitate the interaction between the multimedia component 1108 and the processing component 1102.

The memory 1104 is configured to store various types of data to support the operation of the device 1100. Examples of such data include instructions for any applications or methods operated on the device 1100, contact data, phonebook data, messages, pictures, video, etc. The memory 1104 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1106 is configured to provide power to various components of the device 1100. The power component 1106 may include a power management system, one or more power sources, and any other components associated with the generation, management, and distribution of power in the device 1100.

The multimedia component 1108 includes a screen providing an output interface between the device 1100 and the user. In some embodiments, the screen may include a liquid crystal display (LCD) and a touch panel (TP). If the screen includes the touch panel, the screen may be implemented as a touch screen to receive an input signal from the user. The touch panel includes one or more touch sensors to sense touches, swipes, and gestures on the touch panel. The touch sensor may not only sense a boundary of a touch or swipe action, but also sense a period of time and a pressure associated with the touch or swipe action. In some embodiments, the multimedia component 1108 includes a front camera and/or a rear camera. The front camera and/or the rear camera may receive an external multimedia datum while the device 1100 is in an operation mode, such as a photographing mode or a video mode. Each of the front camera and the rear camera may be a fixed optical lens system or have focus and optical zoom capability.

The audio component 1110 is configured to output and/or input an audio signal. For example, the audio component 1110 includes a microphone ("MIC") configured to receive an external audio signal when the device 1100 is in the operation mode, such as a call mode, a recording mode, and a voice recognition mode. The received audio signal may be further stored in the memory 1104 or transmitted via the communication component 1116. In some embodiments, the audio component 1110 further includes a speaker to output audio signals.

The I/O interface 1112 is configured to provide an interface between the processing component 1102 and peripheral interface modules. The peripheral interface module may be such as a keyboard, a click wheel, buttons, and the like. The buttons may include, but be not limited to, a home button, a volume button, a starting button, and a locking button.

The sensor component 1114 includes one or more sensors for providing status assessments of various aspects of the device 1100. For example, the sensor component 1114 may detect an open/closed status of the device 1100, relative positioning of components, e.g., the display and the keypad of the device 1100, a change in position of the device 1100 or a component of the device 1100, a presence or absence of the user contact with the device 1100, an orientation or an acceleration/deceleration of the device 1100, and a change in temperature of the device 1100. The sensor component 1114 may include a proximity sensor configured to detect the presence of nearby objects without any physical contact. The sensor component 1114 may also include a light sensor, such as a CMOS (complementary metal-oxide-semiconductor)) or a CCD (charge coupled device) image sensor, for using in an imaging application. In some embodiments, the sensor component 1114 may also include an accelerometer sensor, a gyroscope sensor, a magnetic sensor, a pressure sensor, or a temperature sensor.

The communication component 1116 is configured to facilitate a wired or wireless communication between the device 1100 and other devices. The device 1100 may access a wireless network based on a communication standard, such as Wi-Fi, 2G, or 3G, 4G, 5G, or a combination thereof. In one or more embodiments, the communication component 1116 receives a broadcast signal or broadcast associated information from an external broadcast management system via a broadcast channel. In one or more embodiments, the communication component 1116 further includes a near field communication (NFC) module to facilitate a short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In one or more embodiments, the device 1100 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In one or more embodiments, there is also provided a non-transitory computer-readable storage medium including instructions, such as the memory 1104 including instructions. The above instructions may be executed by the processor 1120 in the device 1100 for performing the above-described methods. For example, the non-transitory computer-readable storage medium may be a ROM, a RAM, a CD-ROM, a magnetic tape, a floppy disc, an optical data storage device, and the like.

With the non-transitory computer readable storage medium, when instructions in the storage medium are executed by a processor in a mobile terminal, the mobile device is enabled to execute an intelligent device recognition method. The method includes: recognizing prompt frequency information of a prompt component of an intelligent device; determining a unique identification code of the intelligent device based on the prompt frequency information; and determining relevant information of the intelligent device based on the unique identification code.

With the non-transitory computer readable storage medium, when instructions in the storage medium are executed by a processor in a mobile terminal, the mobile device is enabled to execute an intelligent device processing method. The method includes: obtaining prompt frequency information of a prompt component of an intelligent device, the prompt frequency information representing a unique identification code of the intelligent device; and controlling the prompt component of the intelligent device to provide prompt information based on the prompt frequency information.

Other embodiments of the present disclosure will be apparent to the skilled in the art from consideration of the specification and practice of the present disclosure disclosed here. This present disclosure is intended to cover any variations, uses, or adaptations of the present disclosure following the general principles thereof and including such departures from the present disclosure as come within known or customary practice in the art. It is intended that the specification and examples be considered as examples merely, with a true scope and spirit of the present disclosure being indicated by the following claims.

It should be understood that the present disclosure is not limited to the exaction construction that has been described above and illustrated in the accompanying drawings, and that various modifications and changes may be made without departing from the scope thereof. It is intended that the scope of the present disclosure only be limited by the appended claims.

What is claimed is:

1. An intelligent device recognition method, applied to a terminal device, wherein the method comprises:
   obtaining prompt frequency information of a prompt circuit of an intelligent device;
   determining a unique identification code of the intelligent device based on the prompt frequency information; and
   determining relevant information of the intelligent device based on the unique identification code,
   wherein the relevant information of the intelligent device comprises a manufacturer information, a type or a model of the intelligent device.

2. The intelligent device recognition method according to claim 1, wherein obtaining the prompt frequency information of the prompt circuit of the intelligent device comprises:
   obtaining visual prompt frequency information of a visual prompt circuit of the intelligent device; and
   wherein determining the unique identification code of the intelligent device based on the prompt frequency information comprises:
      determining the unique identification code of the intelligent device based on the visual prompt frequency information.

3. The intelligent device recognition method according to claim 1, wherein obtaining the prompt frequency information of the prompt circuit of the intelligent device comprises:
   obtaining sound signal frequency information of a sound prompt circuit of the intelligent device; and
   wherein determining the unique identification code of the intelligent device based on the prompt frequency information comprises:
      determining the unique identification code of the intelligent device based on the sound signal frequency information.

4. The intelligent device recognition method according to claim 1, wherein determining the unique identification code of the intelligent device based on the prompt frequency information comprises:
   querying a mapping table between the prompt frequency information and the unique identification code of the intelligent device based on the prompt frequency information, and
   determining the unique identification code of the intelligent device.

5. The intelligent device recognition method according to claim 1, wherein the method further comprises:

obtaining a shape of the intelligent device; and
determining the relevant information of the intelligent device based on the shape and the unique identification code of the intelligent device.

6. An intelligent device processing method, comprising:
obtaining prompt frequency information of a prompt circuit of an intelligent device, wherein the prompt frequency information comprises a unique identification code of the intelligent device for determining relevant information of the intelligent device; and
controlling the prompt circuit to provide prompt information based on the prompt frequency information,
wherein the relevant information of the intelligent device comprises a manufacturer information, a type or a model of the intelligent device.

7. The intelligent device processing method according to claim 6, wherein obtaining the prompt frequency information of the prompt circuit of the intelligent device comprises:
obtaining visual prompt frequency information of a visual prompt circuit of the intelligent device, wherein the visual prompt frequency information comprises the unique identification code of the intelligent device; and
wherein controlling the prompt circuit of the intelligent device to provide the prompt information based on the prompt frequency information comprises:
controlling the visual prompt circuit to provide a visual prompt based on the visual prompt frequency information.

8. The intelligent device processing method according to claim 6, wherein obtaining the prompt frequency information of the prompt circuit of the intelligent device comprises:
obtaining sound signal frequency information of a sound prompt circuit of the intelligent device, wherein the sound signal frequency information comprises the unique identification code of the intelligent device; and
wherein controlling the prompt circuit of the intelligent device to provide the prompt information based on the prompt frequency information comprises:
controlling the sound prompt circuit to provide a sound prompt based on the sound signal frequency information.

9. The intelligent device processing method according to claim 6, further comprising:
establishing a mapping relationship between the unique identification code of the intelligent device and the prompt frequency information of the component of the intelligent device.

10. An intelligent device recognition apparatus, comprising:
one or more processors; and
a non-transitory computer-readable storage medium configured to store instructions executable by the one or more processors;
wherein the one or more processors are configured to:
obtain prompt frequency information of a prompt circuit of an intelligent device;
determine a unique identification code of the intelligent device based on the prompt frequency information; and
determine relevant information of the intelligent device based on the unique identification code,
wherein the relevant information of the intelligent device comprises a manufacturer information, a type or a model of the intelligent device.

11. The intelligent device recognition apparatus according to claim 10, wherein the one or more processors configured to obtain the prompt frequency information of the prompt circuit of the intelligent device are further configured to:
obtain visual prompt frequency information of a visual prompt circuit of the intelligent device; and
wherein the one or more processors configured to determine the unique identification code of the intelligent device based on the prompt frequency information are further configured to:
determine the unique identification code of the intelligent device based on the visual prompt frequency information.

12. The intelligent device recognition apparatus according to claim 10 wherein the one or more processors are configured to obtain the prompt frequency information of the prompt circuit of the intelligent device are further configured to:
obtain sound signal frequency information of a sound prompt circuit of the intelligent device; and
wherein the one or more processors configured to determine the unique identification code of the intelligent device based on the prompt frequency information are further configured to:
determine the unique identification code of the intelligent device based on the sound signal frequency information.

13. The intelligent device recognition apparatus according to claim 10, wherein the one or more processors configured to determine the unique identification code of the intelligent device based on the prompt frequency information are further configured to:
query a mapping table between the prompt frequency information and the unique identification code of the intelligent device based on the prompt frequency information; and
determine the unique identification code of the intelligent device.

14. The intelligent device recognition apparatus according to claim 10, wherein the one or more processors are further configured to:
obtain a shape of the intelligent device; and
determine the relevant information of the intelligent device based on the shape and the unique identification code of the intelligent device.

* * * * *